United States Patent [19]

Bakula et al.

[11] Patent Number: 4,845,792
[45] Date of Patent: Jul. 11, 1989

[54] TWO-PART ADJUSTABLE APPROACH RAMP

[75] Inventors: Gerald R. Bakula, Kenosha; Donald J. Caldwell; Andrzej J. Dlugolecki, both of Milwaukee, all of Wis.

[73] Assignee: Snap-on Tools Corporation, Kenosha, Wis.

[21] Appl. No.: 186,950

[22] Filed: Apr. 27, 1988

[51] Int. Cl.⁴ .............................................. E01D 1/00
[52] U.S. Cl. ...................................... 14/69.5; 14/71.1
[58] Field of Search ............... 14/69.5, 71.1; 414/229, 414/537; 254/88, 89 R; 410/4; 105/436, 458; 296/61

[56] References Cited

U.S. PATENT DOCUMENTS

| | | | |
|---|---|---|---|
| 981,613 | 1/1911 | Carter | 14/69.5 |
| 2,720,036 | 10/1955 | Berger | 254/89 R X |
| 2,962,980 | 7/1956 | Carrigan | 104/33 |
| 3,095,591 | 9/1960 | Buck | 14/69.5 |
| 3,294,367 | 12/1966 | Liskey | 254/88 |
| 3,440,782 | 4/1969 | Stone, Jr. | 52/175 |
| 3,827,385 | 8/1974 | Soma | 14/71.1 X |
| 4,021,071 | 5/1977 | Norman | 414/537 X |
| 4,114,944 | 9/1978 | Joynt et al. | 414/537 |
| 4,238,003 | 12/1980 | Hunter | 254/88 X |
| 4,348,780 | 9/1982 | Angelo et al. | 14/71.3 |
| 4,372,727 | 2/1983 | Fredrickson et al. | 414/537 |
| 4,601,632 | 7/1986 | Agee | 14/71.1 |
| 4,726,516 | 2/1988 | Cree | 14/69.5 X |
| 4,750,856 | 6/1988 | Lapiolahti | 410/4 X |

*Primary Examiner*—Jerome W. Massie, IV
*Assistant Examiner*—Matthew Smith
*Attorney, Agent, or Firm*—Emrich & Dithmar

[57] ABSTRACT

An approach ramp for an automotive support platform includes first and second ramp members, the trailing end of the first ramp member being pivotally connected to the leading end of the platform. The second ramp member is both slidably and pivotally movable with respect to the first ramp member. Each ramp member carriers rollers at its leading end for engagement with the floor when the platform is lowered to an access position. In one configuration the ramp members are disposed in overlapping parallel relationship to define a single ramp incline. In a second configuration the second ramp member is extended from the first and is inclined with respect thereto to form a dual-slope ramp incline.

20 Claims, 4 Drawing Sheets

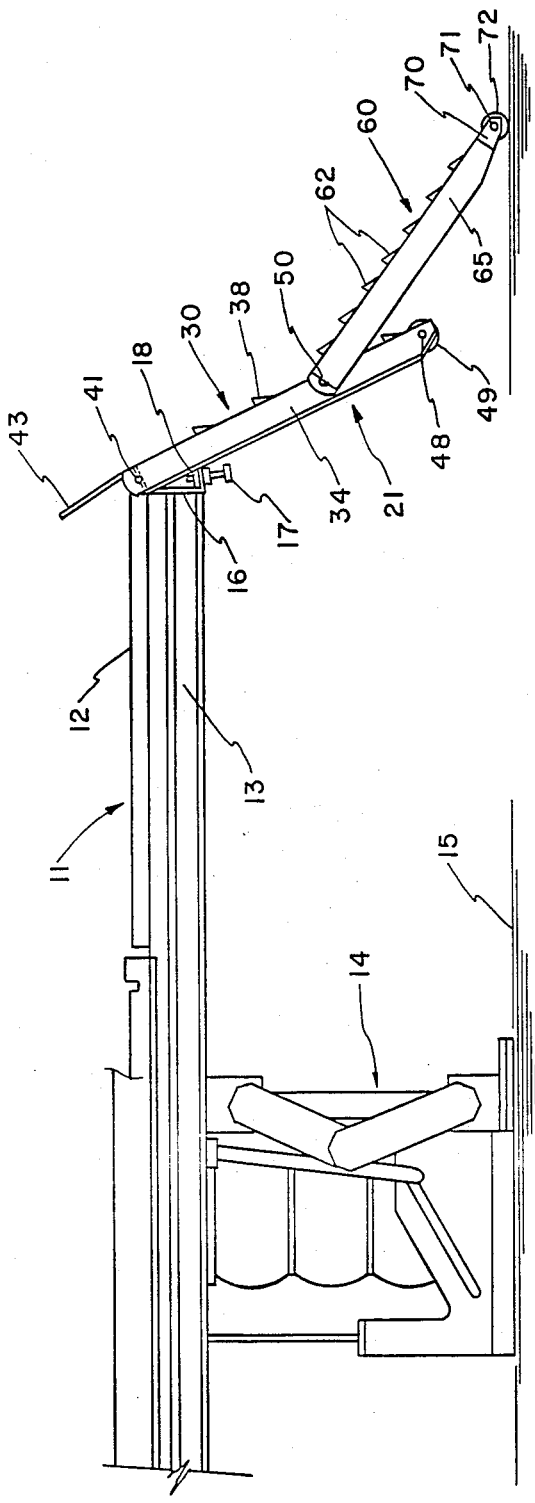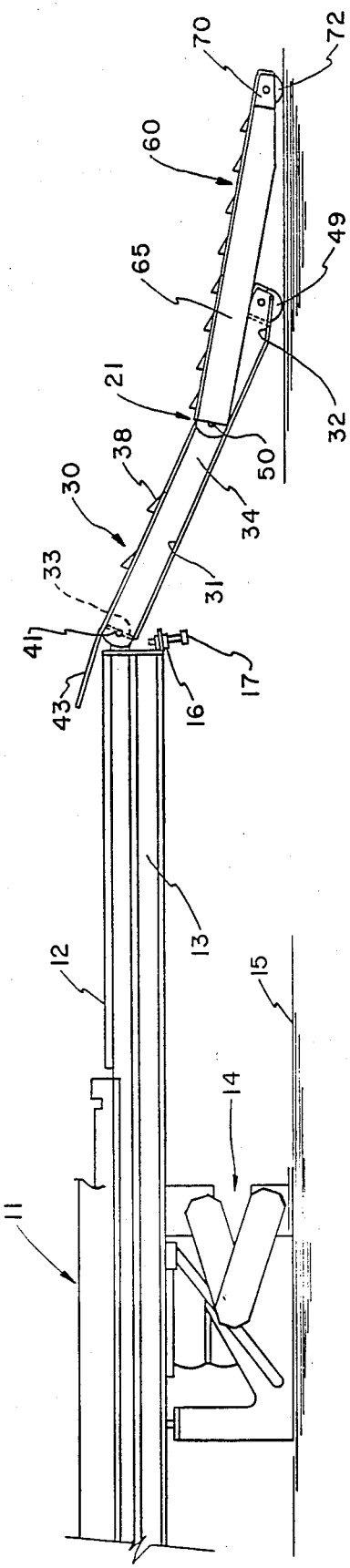

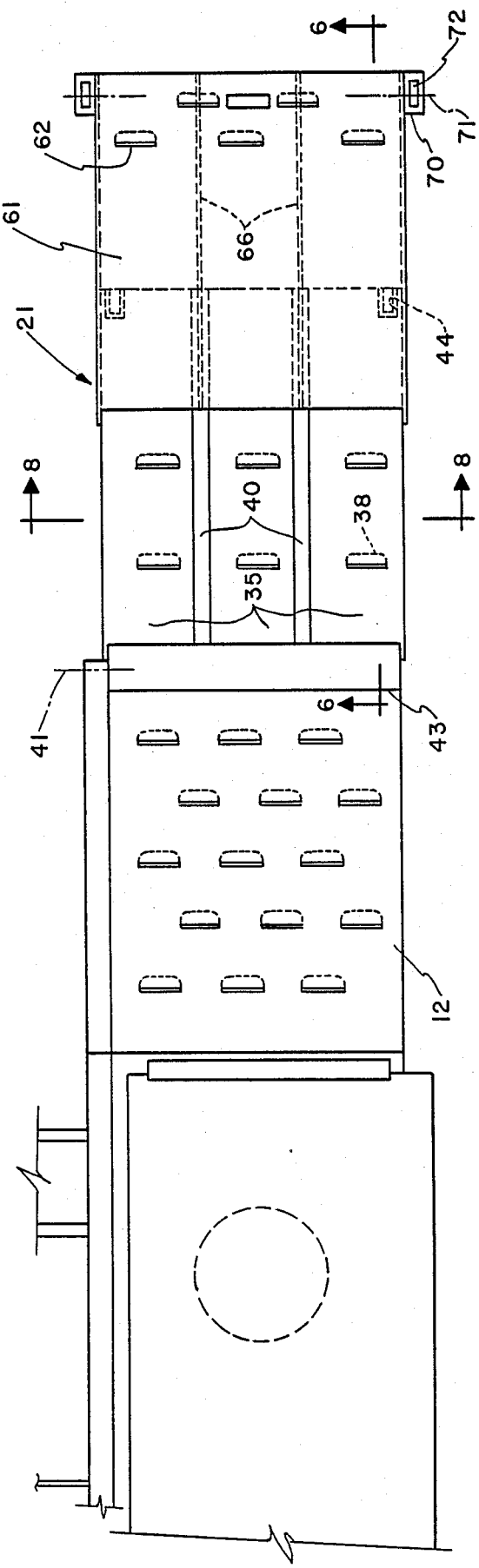
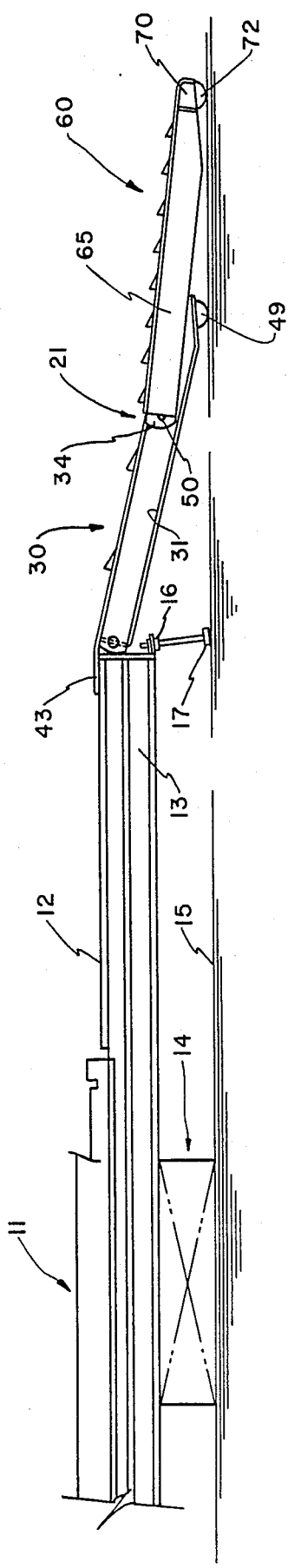
FIG. 4
FIG. 5

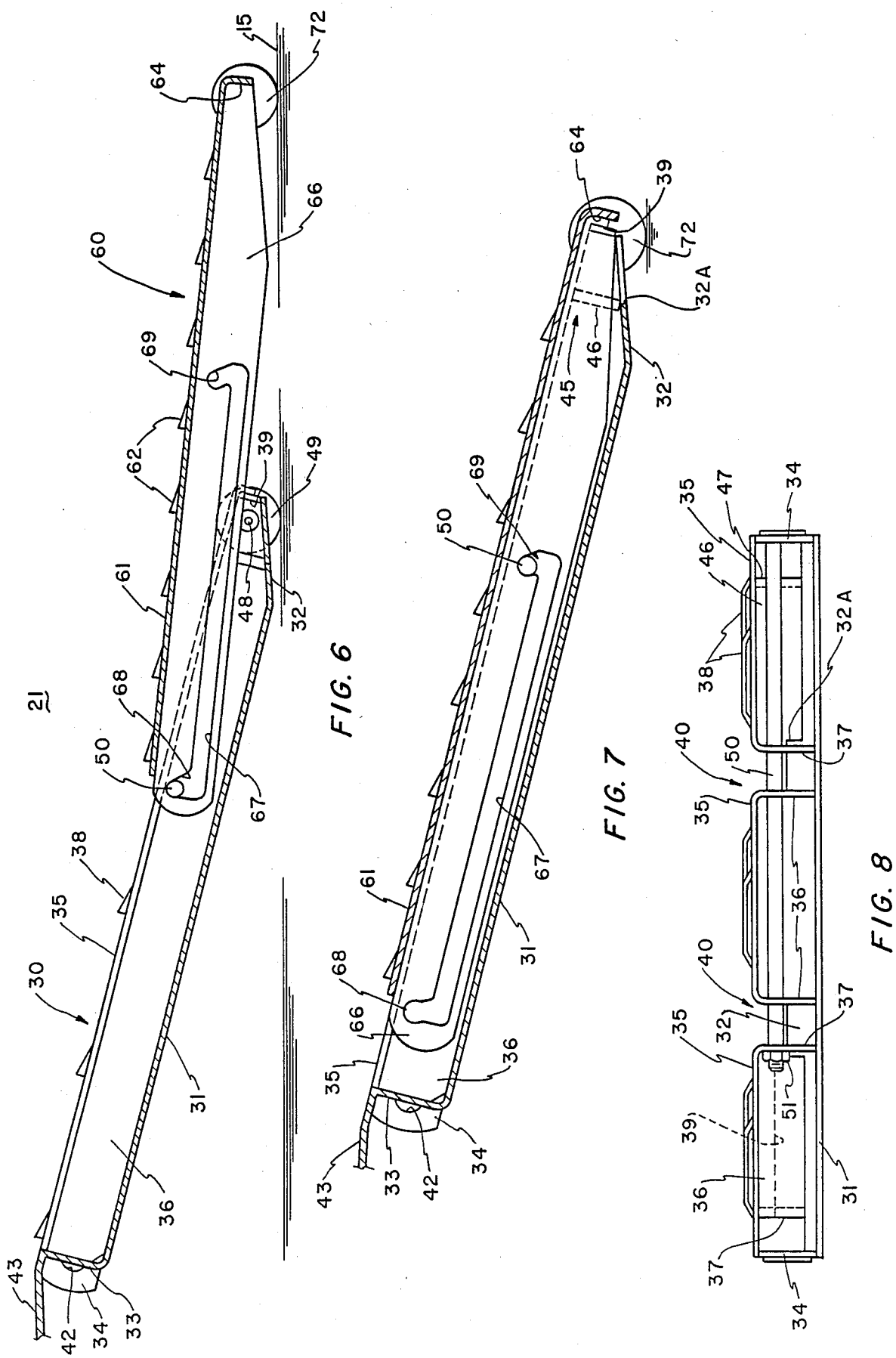

TWO-PART ADJUSTABLE APPROACH RAMP

BACKGROUND OF THE INVENTION

1. Field of the Invention

The present invention relates to inclined approach ramps for automotive support platforms, and particularly to ramps for vertically movable support platforms, such as drive-on wheel alignment platforms of the type used in automotive service stations and the like.

2. Description of the Prior Art

Automotive service stations, garages and the like typically have vehicle platforms for supporting an automotive vehicle for the performance of various service functions thereon. The platform, which may comprise a pair of transversely spaced-apart runways, is typically elevated or elevatable so as to facilitate access to the underside of the vehicle. In the case of an elevated platform, an access or approach ramp must be provided to permit the vehicle to be driven onto the platform. Even in the case of lift-type platform which is movable vertically between raised and lowered positions, in the lowered access position, the platform is still typically spaced above the floor of the garage so as to accommodate the lifting mechanism, so that an approach ramp must also be used in this case. One such type of elevatable platform is a wheel alignment platform, which carries apparatus specifically designed for use in performing wheel and front end alignment functions on the vehicle.

Heretofore, such automotive service platforms have utilized approach ramps which define an inclined plane, disposed at a single predetermined angle to the garage floor. The angle must be shallow enough to prevent the underside of the the vehicle from contacting the ramp or the horizontal platform, and yet steep enough so that the overall length of the ramp will be short enough to fit within the dimensions of the garage.

Many newer styles of automobiles have low-slung chassis providing a minimal clearance between the bottom of the chassis and the roadway. For example, many vehicles have at the front end of the chassis a depending "air dam" for aerodynamic purposes, which provides very little ground clearance. When such vehicles are driven onto the existing approach ramps for automotive service platforms, such as wheel alignment platforms, the "air dam" or some other part of the chassis frequently strikes the ramp before the front wheels of the vehicle contact the ramp, resulting in damage to the vehicle. This can be avoided by providing an approach ramp at a shallower angle, but it has been found that when the ramp angle is made small enough to avoid contact with low-slung vehicle chassis, the length of the ramp becomes such that it may extend beyond the limits of the garage floor so that the garage door cannot be closed.

SUMMARY OF THE INVENTION

It is a general object of the present invention to provide an improved approach ramp structure for a vehicle support platform which avoids the disadvantages of prior approach ramps which affording additional structural and operating advantages.

An important feature of the invention is the provision of an approach ramp structure which avoids interference with low ground clearance vehicle chassis, while at the same time affording an overall ramp length which can conveniently be accommodated by existing garage facilities.

Another feature of the invention is the provision of an approach ramp structure of the type set forth which provides two different inclines of increasing slope.

Yet another feature of the invention is the provision of an approach ramp structure of the type set forth, which can be usable in either a single-slope or a dual-slope configuration.

Another feature of the invention is the provision of an approach ramp structure of the type set forth, which automatically assumes its use configuration when the associated platform is lowered.

These and other features of the invention are attained by providing approach ramp apparatus for an automotive support structure including a generally horizontal platform having a leading end and being vertically movable between a lowered access position and a raised use position relative to an underlying access surface, the approach ramp apparatus comprising: a first ramp member having a leading end and a trailing end, the first ramp member being coupled adjacent to the trailing end thereof to the leading end of the platform for pivotal movement about a substantially horizontal first axis, and a second ramp member having a leading end and a trailing end, the second ramp member being coupled adjacent to the trailing end thereof to the first ramp member intermediate the ends thereof for pivotal movement about a substantially horizontal second axis, the leading end of the second ramp member being movably engageable with the access surface in response to movement of the platform from the raised position to the lowered position thereof for guiding the first and second ramp members to a use configuration inclined at different angles to the access surface.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 2 is a fragmentary side elevational view of the platform and associated ramp structure of FIG. 1;

FIG. 3 is a view similar to FIG. 2, illustrating the support platform in a partially lowered position;

FIG. 4 is a fragmentary top plan view of one of the platform runways of FIG. 1, illustrated in its fully lowered position;

FIG. 5 is a side elevational view of the runway of FIG. 4;

FIG. 6 is an enlarged fragmentary view in vertical section taken along the line 6—6 in FIG. 4;

FIG. 7 is a view similar to FIG. 6, illustrating the ramp structure in another use configuration, and FIG. 8 is an enlarged sectional view taken along the line 8—8 in FIG. 4, perpendicular to the plane of the upper ramp of the ramp structure.

DESCRIPTION OF THE PREFERRED EMBODIMENT

Figure 1:
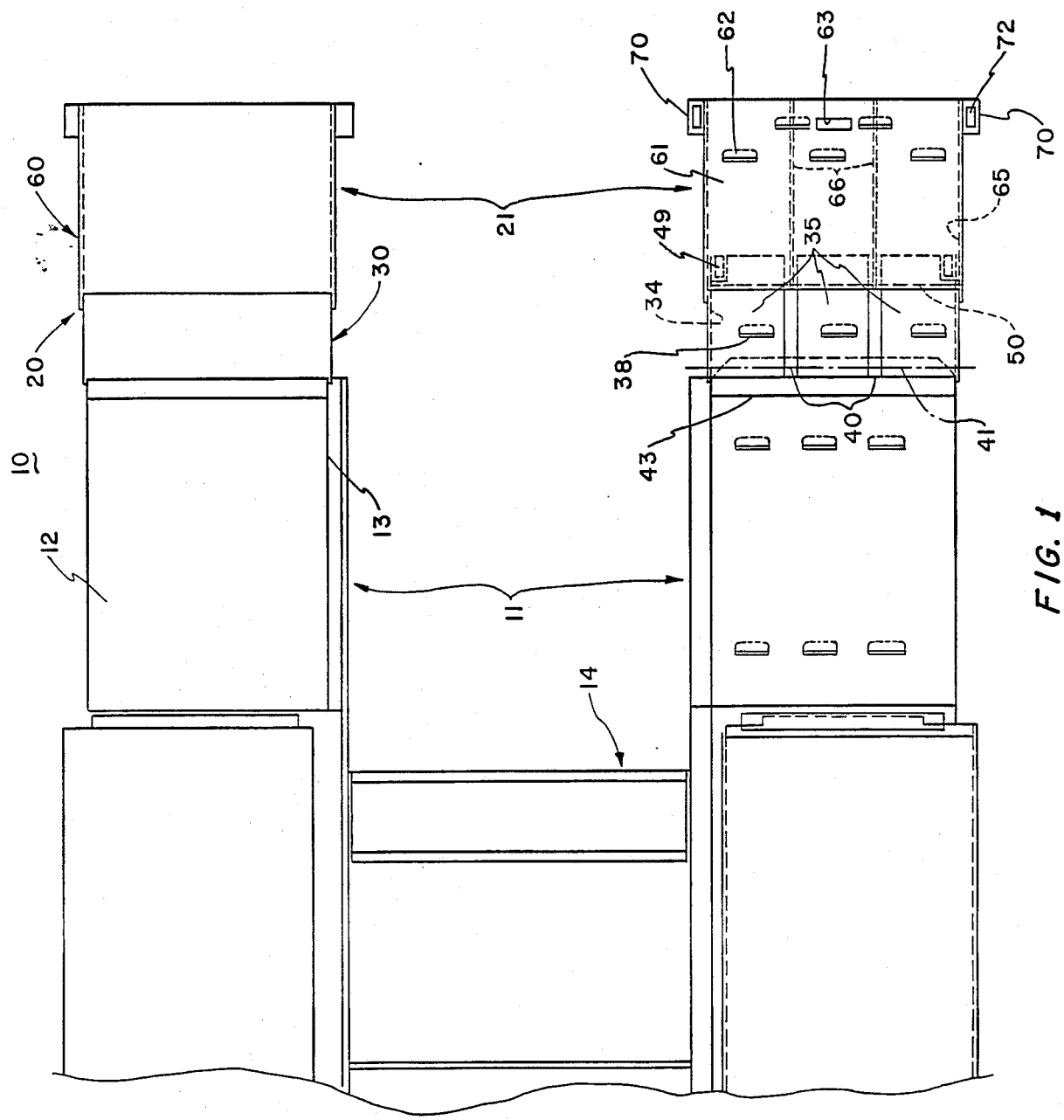
FIG. 1 is a fragmentary, top plan view of a wheel alignment platform comprising a pair of spaced-apart runways, each having approach ramp structure constructed in accordance with and embodying the features of the present invention, with the support platform shown in its raised position.

Referring to FIG. 1, there is illustrated a vehicle support platform, generally designated by the numeral 10, which is of the type utilized for front end or wheel alignment service on automotive vehicles. However, it will be appreciated that the principles of the present invention may be utilized with other types of vehicle support platforms. The support platform 10 includes a pair of laterally spaced-apart runways 11 arranged for alignment with the wheel tracks of vehicles to be serviced. However, it will be appreciated that the principles of the present invention could also be utilized with platforms having continuous flat decks. The runways 11 are interconnected by cross members (not shown) in standard fashion. The runways 11 are substantially mirror images of each other, wherefore only one will be described in detail.

Each of the runways 11 has a flat, substantially horizontal deck 12, provided with depending side rails 13. A lift mechanism 14 is provided for effecting vertical movement of the support platform 10 between a raised position, illustrated in FIGS. 1 and 2 and a fully lowered access position illustrated in FIGS. 4–6. The lifting mechanism 14 may be provided under each of the runways 11 or may be provided beneath the cross structure interconnecting the runways 11, all in a conventional manner. The lifting mechanism 14 is mounted on a floor 15 (FIGS. 2 and 3) of an automotive service garage or the like. At the leading end of the runway 11 is a bracket 16 which carries a depending leveling screw 17 secured in a place by locknuts 18 (FIG. 2). The head of the leveling screw 17 is adapted to engage the floor 15 when the support platform 10 is disposed in its fully lowered access position. The length that the leveling screw 17 depends from the bracket 16 can be adjusted for assuring that the decks 12 of the runways 11 are substantially coplanar and horizontal.

A vehicle to be serviced is driven from the floor 15 onto the runways 11 via a ramp structure generally designated by the numeral 20, constructed in accordance with and embodying the features of the present invention. The ramp structure 20 includes two substantially identical ramp assemblies 21, respectively coupled to the leading ends of the runways 11, wherefore only one of the ramp assemblies 21 will be described in detail. It is a fundamental feature of the present invention that each of the ramp assemblies 21 includes two basic parts, viz., an upper ramp 30 and an lower ramp 60.

Referring now also to FIGS. 6 through 8 of the drawings each upper ramp 30 includes a rectangular base plate 31 provided at the leading end thereof with an upturned, inclined leading end 32, and provided at the trailing end thereof with an upstanding rear flange 33 disposed substantially perpendicular to the base plate 31. Fixedly secured to the base plate 31, respectively at the lateral side edges thereof are two upstanding side plates 34, each extending longitudinally from the front edge of the upturned leading end 32 to a point slightly rearwardly of the rear flange 33.

Carried by the base plate 31 are three rectangular deck plates 35, each extending from the rear flange 33 to the front edges of the side plates 34. The center one of the deck plates 35 is provided at its lateral edge with depending flanges 36, the lower edges of which are fixedly secured to the upper surface of the base plate 31. The side ones of the deck plates 35 are substantially mirror images of each other, each having the outer edge thereof resting upon and fixedly secured to the upper edge of the associated side plate 34, and each provided at its inner edge with a depending flange 37, the lower edge of which is fixedly secured to the upper surface of the base plate 31. Each of the deck plates 35 is provided with a plurality of raised traction tabs 38 struck therefrom to facilitate traction of the vehicle wheels rolling thereon. Each of the deck plates 35 is provided at its forward end with a depending front lip 39. The deck plate 35 are equidistantly spaced apart laterally of the upper ramp 30 so as to define therebetween two longitudinally extending channels 40, for a purpose to be explained more fully below.

The rear ends of the side plates 34 are provided with holes 42 therethrough for receiving stub shafts 41 (FIG. 3) for pivotally connecting the upper ramp 30 to the side rails 13 of the associated runway 11 at the leading end thereof. Integral with the deck plates 35 and projecting rearwardly therefrom is a tongue 43 which extends laterally the entire width of the upper ramp 30 and is inclined downwardly with respect to the plane of the deck plates 35 at a predetermined shallow angle, the angle being selected so that when the support platform 10 is disposed in its fully lowered access position, illustrated in FIG. 5, the tongue 43 will overlap and rest upon the leading edge of the associated runway deck 12, substantially parallel thereto.

The upturned leading end 32 of the base plate 31 is provided at the front edge thereof with rectangular notches or cutouts 32A at the opposite sides thereof. Each of the outer ones of the deck plates 35 is similarly provided with a small rectangular notch or cutout 44 (FIG. 4) at the forward outer corner thereof. Mounted at the leading ends of each of the outer deck plates 35, respectively, are two angle brackets 45, each having a laterally extending rear wall 46 and a forwardly extending flange 47 projecting from the outer end of the rear wall 46. The brackets 45 are fixedly secured, as by welding or the like, to the upturned leading end 32 of the base plate 31 and to the front lips 39 of the deck plates 35. The flanges 47 are respectively parallel to and spaced laterally inwardly from the front ends of the side plates 34 and receive through complementary openings therein stub shafts 48 for rotatably mounting rollers 49 (FIG. 6), the circumferential surfaces of which project downwardly below the level of the base plate 31.

The upper ramp 30 is also provided intermediate the leading and trailing ends thereof with a horizontal shaft 50 which is disposed approximately one third the distance from the leading end to the trailing end of the upper ramp 30. The shaft 50 may be provided with a suitable head (not shown) and extends through complementary openings in the inner one of the side plates 34, and the flanges 36 and 37 of the deck plates 35, being secured in place by a locknut 51 on the inner surface of the flange 37 of the outer deck plate 35. It can be seen that the shaft 50 extends across the channels 40 a slight distance below the level of the deck plates 35, for the purpose of coupling to the upper ramp 30 the associated ramp 60.

The lower ramp 60 includes a flat rectangular deck plate 61 which has a plurality of upstanding traction tabs 62 struck therefrom as well as a plurality of rectangular cutouts 63 (one shown in FIG. 1), which serve the purpose of material lightening and provide drainage openings. Integral with the deck plate 61 at the leading end thereof is a downturned lip 64. Fixedly secured to the deck plate 61 at the lateral side edges thereof, respectively, and depending therefrom are two side plates 65 (FIG. 1-3 and 5), which are generally rectangular in shape. Also fixedly secured to the deck plate 61 and depending therefrom are two generally rectangular flanges 66, which extend longitudinally from the front lip 64 to a point slightly beyond the rear edge of the deck plate 61, and are equidistantly spaced apart laterally between the side plates 65. The lower edges of the side plates 65 and the flanges 66 are truncated at the leading ends thereof to provide inclined edge surfaces. Each of the flanges 66 is provided with an elongated slot 67 therethrough. The slot 67 extends from adjacent the trailing end of the flange 66 to a point approximately two-thirds of the distance from the trailing end to the leading end thereof, each slot 67 being provided at its trailing end with an upwardly projecting lobe 68 and being provided at its other end with an upwardly projecting lobe 69. The parts are arranged so that the flanges 66 respectively fit in the channels 40 of the upper ramp 30, with the shaft 50 extending through the slots 67 for interconnecting the upper and lower ramps 30 and 60.

Respectively fixedly secured to the side plates 65 at the leading ends thereof and projecting laterally outwardly therefrom are two generally channel-shaped brackets 70 (FIGS. 1-5). The brackets 70 cooperate with the associated side plate 65 for defining enclosures for rollers 72, which are rotatably mounted on stub shafts 71 received through complementary openings in the side plates 65 and the brackets 70.

Referring in particular to FIGS. 7 and 8, it can be seen that the interconnection of the upper and lower ramps 30 and 60 by the shaft 50 accommodates a dual movement of the lower ramp 60 with respect to the upper ramp 30. When the shaft 50 is disposed in the main portion of the slots 67, the deck plate 61 of the lower ramp 60 is spaced above the deck plate 35 of the upper ramp 30, and the lower ramp 60 is slidably movable parallel to the upper ramp 30 for the length of the slots 67. When the shaft 50 is disposed at the leading end of the slots 67, the lower ramp 60 can be dropped into overlapping engagement with the upper ramp 30, the shaft 50 being received in the lobes 69 of the slots 67 for locking the lower ramp 60 in position, as illustrated in FIG. 7. In this configuration, the deck plates 61 and 35 are disposed in parallel overlapping engagement with each other. When the lower ramp 60 is disposed in this retracted condition, the flanges 66 are accommodated in the channels 40 and the leading end of the lower ramp 60 extends only a very slight distance beyond the leading end of the upper ramp 30.

The lower ramp 60 can also be moved to an extended condition, illustrated in FIG. 6, by sliding the lower ramp 60 along the shaft 50 until the shaft 50 is at the trailing end of the slots 67, at which point the lower ramp 60 is lowered to move the shaft 50 into the lobes 68 of the slots 67 to lock the parts in position. In this configuration, it can be seen that the lower ramp 60 extends forwardly well beyond the leading end of the upper ramp 30 and is pivotal with respect thereto about the axis of the shaft 50.

Referring now more particularly to FIGS. 2, 3, 5 and 6, the operation of the support platform 10 will be explained. When the lower ramps 60 are disposed in their extended conditions with respect to the upper ramps 30, they hang down by gravity from the leading ends of the runways 11. When the support platform 10 is in its raised position, as illustrated in FIG. 2, the lower ramps 60 may or may not reach to the floor 15, depending upon the height of the support platform 10 in its fully raised position. The range of pivoting movement of the upper ramp 30 about the axis of the stub shafts 41 is such that the upper ramp 30 cannot reach a fully vertical position, but is always inclined slightly forwardly. Thus, as the support platform 10 is lowered, the rollers 72 of the lower ramps 60 engage the floor 15 and roll forwardly therealong away from the leading ends of the runways 11, this movement being accommodated by pivoting of the lower ramps 60 about the axes of the shafts 50. As the support platform 10 is lowered still further, the rollers 49 of the upper ramps 30 engage the floor 15 and roll forwardly therealong, this movement being accommodating by a pivoting of the upper ramps 30 about the axis of the stub shafts 41.

When the support platform 10 has reached its fully lowered access position, the leveling screws 17 engage the floor 15, and the ramp assemblies 21 are disposed in the configuration illustrated in FIGS. 5 and 6. In this configuration, it can be seen that the lower ramps 60 are disposed at a first very shallow angle with respect to the floor 15, while the upper ramps 30 are disposed at a second somewhat larger angle with respect to the floor 15. The angle of inclination of the lower ramp 60 is such that it will not provide any interference with the lowermost parts of the chassis of the vehicle, even if those parts would have interfered with a single-piece approach ramp inclined at the angle of inclination of the upper ramp 30. In the FIG. 6 configuration of the ramp assemblies 21 of the present invention, by the time these lowermost portions of the leading end of the vehicle chassis will have reached the upper ramp 30, the vehicle wheels will be moving up the lower ramp 60, thereby raising the chassis so that it does not interfere with the upper ramp 30.

This dual-slope configuration has important advantages over prior art approach ramps. While it is longer than the single upper ramp 30, it is not as long as a single ramp inclined at the angle of inclination of the lower ramp 60 would be. Furthermore, even if the overall length of the ramp assemblies 21 in their fully lowered configuration illustrated in FIG. 6 would be such as to interfere with closure of the garage door, once the vehicle is driven onto the support platform 10, and the platform is raised, the ramp assemblies 21 hang downwardly from the platforms 10 so as not to extend substantially forwardly therebeyond so that the doors can be easily closed. Another important advantage of the invention is that, as explained above, when the support platform 10 is lowered back to its access position, the arrangement of the ramps 30 and 60, and, particularly, the rollers 49 and 72 thereof is such that the ramp assemblies 21 automatically assume their access configuration of FIG. 6, in response to the lowering movement of the support platform 10.

It will be appreciated that, if desired, the ramp assemblies 21 could also be utilized in the configuration illustrated in FIG. 7, wherein the upper and lower ramps 30 and 60 are disposed in overlapping relationship, and define a single inclined angle. In this configuration, the ramp structure 20 functions in substantially the same manner as described above, except that, when the support platform 10 is lowered, the overlapping upper and lower ramps 30 and 60 will move as a unit about the axis of the stub shafts 41. This configuration could be utilized, for example, for vehicles having normal ground clearance.

From the foregoing, it can be seen that there has been provided an improved approach ramp structure for a vehicle support platform, which affords unobstructed access of vehicles to the platform, even where the vehicles have very low ground clearance, while at the same time limiting the longitudinal extension of the ramp structure from the platform when the platform is in use.

We claim:

1. Approach ramp apparatus for an automotive support structure including a generally horizontal platform having a leading end and being vertically movable between a lowered access position and a raised position relative to an underlying access surface, said approach ramp apparatus comprising: a first ramp member having a leading end and a trailing end, said first ramp member being coupled adjacent to the trailing end thereof to the leading end of the platform for pivotal movement about a substantially horizontal first axis, and a second ramp member having a leading end and a trailing end, said second ramp member being coupled adjacent to the trailing end thereof to said first ramp member intermediate the ends thereof for pivotal movement about a substantially horizontal second axis which is fixed with respect to one of said first and second ramp members, the leading end of said second ramp member being movably engageable with the access surface in response to movement of the platform from the raised position to the lowered position thereof for guiding said first and second ramp members to a use configuration inclined at substantially different angles to the access surface.

2. The apparatus of claim 1, and further comprising rollers carried by the leading end of said second ramp member for rolling engagement with the access surface.

3. The apparatus of claim 1, wherein the leading end of said first ramp member is movably engageable with the access surface in response to movement of the platform from the raised position to the lowered position thereof for cooperation with said second ramp member for guiding said first and second ramp members to the use configuration thereof.

4. The apparatus of claim 3, and further comprising rollers carried by the leading ends of each of said first and second ramp members for rolling engagement with the access surface.

5. The apparatus of claim 1, wherein said second ramp member is inclined at a smaller angle to the access surface than is said first ramp member when said first and second ramp members are disposed in the use configuration thereof.

6. The apparatus of claim 1, and further comprising stop means carried by the platform for limiting the downward movement thereof to its lowered access position.

7. The apparatus of claim 1, wherein the platform includes a pair of transversely spaced-apart runways, said apparatus further comprising a pair of each of said first and second ramp members for coupling respectively to the runways.

8. Approach ramp apparatus for an automotive support structure including a generally horizontal platform having a leading end and being vertically movable between a lowered access position and a raised position relative to an underlying access surface, said approach ramp apparatus comprising: a first ramp member having a leading end and a trailing end, said first ramp member being coupled adjacent to the trailing end thereof to the leading end of the platform for pivotal movement about a substantially horizontal first axis, a second ramp member having a leading end and a trailing end, means coupling said second ramp member to said first ramp member for movement between a retracted condition disposed substantially within the longitudinal confines of said first ramp member and an extended condition projecting well beyond the leading end of said first ramp member, said coupling means accommodating pivotal movement of said second ramp member about a substantially horizontal second axis which is fixed with respect to one of said first and second ramp members when said second ramp member is disposed in the extended condition thereof, the leading end of said first ramp member being movably engageable with the access surface in response to movement of the platform from the raised position to the lowered position thereof for guiding said first ramp member to a use position inclined at a predetermined angle to the access surface, said first and second ramp members being disposed in a first use configuration wherein both are disposed at substantially said predetermined angle to the access surface when said first ramp member is disposed in the use position thereof while said second ramp member is disposed in the retracted condition thereof, said first and second ramp members being disposed in a second use configuration wherein said second ramp member is inclined with respect to the access surface at an angle substantially smaller than said predetermined angle when said first ramp member is disposed in the use position thereof while said second ramp member is disposed in the extended condition thereof.

9. The apparatus of claim 8, wherein said second ramp member in the retracted condition thereof is disposed in overlapping engagement with said first ramp member substantially parallel thereto.

10. The apparatus of claim 8, and further comprising rollers carried by the leading end of said first ramp member for rolling engagement with the access surface.

11. The apparatus of claim 8, wherein the leading end of said second ramp member in the extended condition thereof is movably engageable with the access surface in response to movement of the platform from the raised position to the lowered position thereof for cooperation with said first ramp member in guiding said first and second ramp members to the second use configuration thereof.

12. The apparatus of claim 11, and further comprising rollers carried by the leading ends of each of said first and second ramp members for rolling engagement with the access surface.

13. The apparatus of claim 8, wherein said coupling means includes means accommodating sliding movement of said second ramp member between the extended and retracted conditions thereof.

14. The apparatus of claim 8, wherein said second axis is disposed intermediate the leading and trailing ends of said first ramp member.

15. Approach ramp apparatus for an automotive support surface including a generally horizontal platform having a leading end and being vertically movable between a lowered access position and a raised position relative to an underlying access surface, said approach ramp apparatus comprising: a first ramp member having a leading end and a trailing end, said first ramp member being coupled adjacent to the trailing end thereof to the leading end of the platform for pivotal movement about a substantially horizontal first axis, a substantially horizontal pivot shaft fixed on said first ramp member intermediate the leading and trailing ends thereof, and a second ramp member having a leading end and a trailing end, said second ramp member having a pair of laterally spaced-apart depending flanges extending longitudinally thereof, each of said flanges having an elongated longitudinally extending slot therein, said shaft being received through both of the slots in said second ramp member for interconnecting said first and second ramp members, said shaft being slidably movable longitudinally of said slots for accommodating movement of said second ramp member between a retracted condition disposed substantially within the longitudinal confines of said first ramp member and an extended condition projecting well beyond the leading end of said first ramp member, said second ramp member in the extended condition thereof being pivotally movable about the axis of said shaft, the leading end of said first ramp member being movably engageable with the access surface in response to movement of the platform from the raised position to the lowered position thereof for guiding said first ramp member to a use position inclined at a predetermined angle to the access surface, said first and second ramp members being disposed in a first use configuration wherein both are disposed at substantially said predetermined angle to the access surface when said first ramp member is disposed in the use position thereof while said second ramp member is disposed in the retracted condition thereof, said first and second ramp members being disposed in a second use configuration wherein said second ramp member is inclined with respect to the access surface at an angle substantially smaller than said predetermined angle when said first ramp member is disposed in the use position thereof while said second ramp member is disposed in the extended condition thereof.

16. The apparatus of claim 15, wherein said flanges are spaced laterally inwardly from the lateral side edges of said second ramp member.

17. The apparatus of claim 15, wherein said shaft is disposed intermediate the leading and trailing ends of said first ramp member.

18. The apparatus of claim 17, wherein each of said slots extends longitudinally from the trailing end of said second ramp member to a point spaced from the leading end of said second ramp member.

19. The apparatus of claim 15, and further comprising rollers carried by the leading end of said first ramp members for rolling engagement with the access surface.

20. The apparatus of claim 15, wherein the leading end of said second ramp member in the extended condition thereof is movably engageable with the access surface in response to movement of the platform from the raised position to the lowered position thereof for cooperation with said first ramp member in guiding said first and second ramp members to the second use configuration thereof.

* * * * *